June 22, 1926.

P. E. ANGLADE

VALVE FOR FOOTBALLS

Filed May 24, 1924

1,590,173

Inventor
Prosper Eugène Anglade
per
Attorney.

Patented June 22, 1926.

1,590,173

UNITED STATES PATENT OFFICE.

PROSPER EUGÈNE ANGLADE, OF MARSEILLE, FRANCE.

VALVE FOR FOOTBALLS.

Application filed May 24, 1924, Serial No. 715,622, and in France May 28, 1923.

This invention relates to valves working constantly under pressure for the air bladders used in foot balls and the like and the aim is to allow the complete closing up of the envelope before inflating and to allow the deflation and reinflation without need of opening said envelope.

Using the proposed valve the air bladder is fixed on the envelope without the necessity of using a rigid connecting element, and the valve may be disposed underneath the opening of the ball envelope which, when inflating, is slightly opened to allow the pump connector to pass, and when the inflation is completed, the connector is withdrawn and the opening closes directly.

Figure 1:
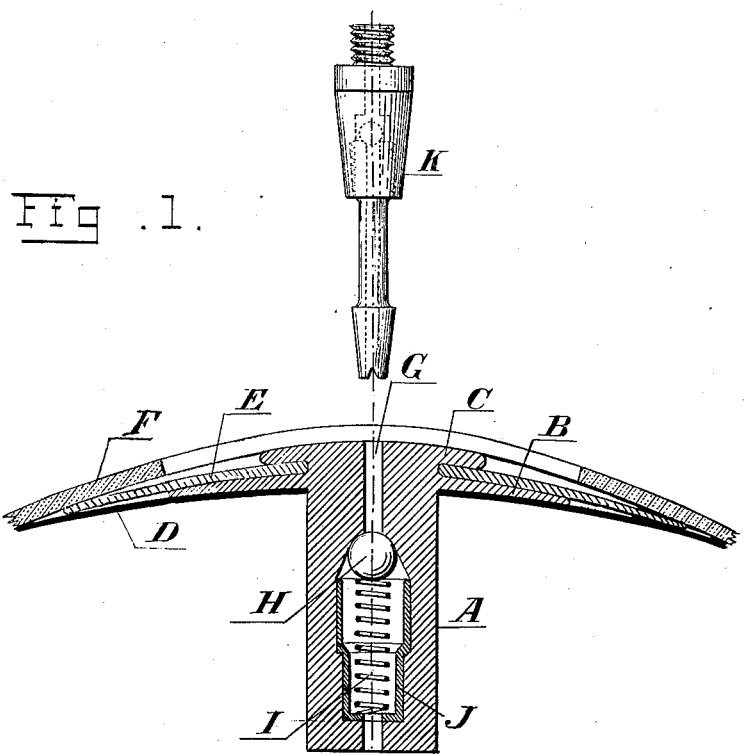
Figure 2:
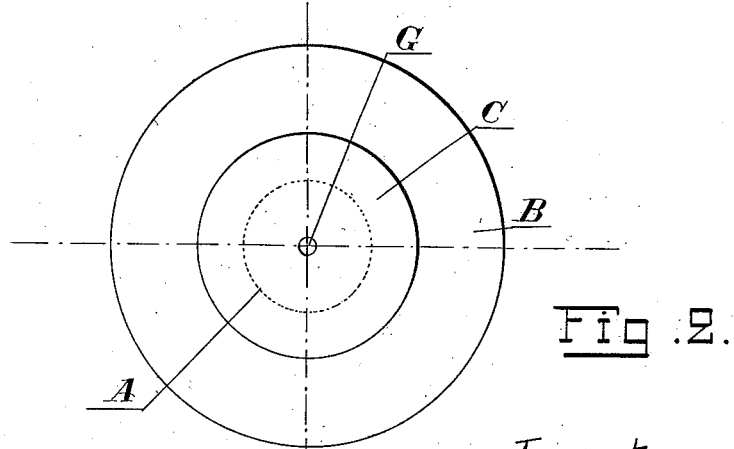

The invention is illustrated in its preferred embodiment in which Fig. 1 is a vertical sectional view along the axis of the valve, the latter being in its proper position inside the ball and Fig. 2 is a plan view of the same valve.

The constantly under pressure working valve consists of a solid rubber block A possessing two annular flanges B and C. The flange B is glued onto the rubber air bladder D and the other flange C forms above the flange B an annular groove in which the leather protecting washer E of the air bladder is lodged below the opening of the ball envelope F.

In the interior of the rubber block A and toward its interior portion a metal tube J is forced in, said tube J containing the helicoidal spring I.

When the opening of the ball envelope is closed up above the flange C, said opening shows only the inflating orifice G in which engages the pump connector constituted by a hollow tubular body K which forms a tight joint during inflation owing to the natural elasticity of the rubber block.

The conical point of the connector, during the inflation bears upon the sphere H and lowers it down upon its spring I to allow the free entrance of the air in the bladder, and as soon as the bladder is properly inflated the spring I presses the sphere H against the orifice G, thus preventing the air from escaping.

I claim:—

An air valve device for footballs and the like comprising a hollow rubber block, an internal rubber valve seat, a metal tube enclosed in the block, a metal ball valve engaging the rubber seat, a spring enclosed in said tube and pressing the ball upon its seat, an annular flange provided on the said block and secured to the air container, and a second annular flange also provided on said block and spaced from the first flange to accommodate and hold, between said flanges, the usual leather washer or flap protecting the air container.

In witness whereof, I have hereunto signed my name, this 7th day of May, 1924.

PROSPER EUGÈNE ANGLADE.